(12) United States Patent
Zhou

(10) Patent No.: US 12,442,381 B2
(45) Date of Patent: Oct. 14, 2025

(54) OSCILLATING MECHANISM OF FAN, AND FAN

(71) Applicant: Shenzhen Hengyufa Technology Co., Ltd., Shenzhen (CN)

(72) Inventor: Jianquan Zhou, Shenzhen (CN)

(73) Assignee: Shenzhen Hengyufa Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/816,434

(22) Filed: Aug. 27, 2024

(65) Prior Publication Data

US 2024/0418174 A1 Dec. 19, 2024

(30) Foreign Application Priority Data

Apr. 22, 2024 (CN) .......................... 202420838110.4

(51) Int. Cl.
*F04D 25/10* (2006.01)
*F16H 21/40* (2006.01)

(52) U.S. Cl.
CPC .......... *F04D 25/105* (2013.01); *F16H 21/40* (2013.01)

(58) Field of Classification Search
CPC ...... F04D 25/105; F04D 25/10; F04D 25/084; F04D 29/601; F04D 29/644; F16H 21/40
See application file for complete search history.

(56) References Cited

U.S. PATENT DOCUMENTS

| | | | | |
|---|---|---|---|---|
| 5,480,282 A | * | 1/1996 | Matson | F04D 25/105 415/125 |
| 8,128,346 B2 | * | 3/2012 | Yu | F04D 25/105 415/125 |
| 8,251,645 B2 | * | 8/2012 | Yu | F04D 25/105 415/125 |
| 9,267,379 B2 | * | 2/2016 | Liu | F04D 29/325 |
| 9,790,948 B2 | * | 10/2017 | Liu | F04D 25/10 |
| 2011/0002784 A1 | | 1/2011 | Yu | |
| 2011/0064577 A1 | | 3/2011 | Yu | |
| 2013/0309068 A1 | | 11/2013 | Liu | |

* cited by examiner

*Primary Examiner* — Eldon T Brockman
(74) *Attorney, Agent, or Firm* — Hemisphere Law, PLLC; Zhigang Ma

(57) ABSTRACT

The present disclosure discloses an oscillating mechanism of a fan, and a fan. The oscillating mechanism of the fan includes: a rotating assembly, wherein the rotating assembly includes a rotating member, a fastener fixedly connected to a lower part of the rotating member, and a driving member fixed inside the rotating member; and a fixing assembly, wherein the fixing assembly includes a first fixing member and a second fixing member fixedly connected to the first fixing member; the second fixing member is arranged above the first fixing member; the first fixing member is fixedly connected to an output portion of the driving member; the fastener is located between the first fixing member and the second fixing member to limit the rotating member onto the fixing assembly; and the rotating member sleeves the second fixing member and rotates relative to the fixing assembly under the driving of the driving member.

10 Claims, 13 Drawing Sheets

OSCILLATING MECHANISM OF FAN, AND FAN

TECHNICAL FIELD

The present disclosure relates to the technical field of fans, and in particular, to an oscillating mechanism of a fan, and a fan.

BACKGROUND

A fan is a household appliance that uses a motor to drive fan blades rotation, thereby accelerating flowing of air. The fan is mainly applied to cooling and air circulation. To enhance the air supply effect and cooling effect of the fan, the fan is usually provided with an oscillating mechanism. The oscillating mechanism of the fan in the prior art usually achieves an oscillating effect by combining a motor and a gear or through a four-connecting-rod mechanism. This oscillating mechanism has the shortcomings that the motor and the gear are combined, so that the overall structure will occupy a large space. When the gear has low machining and assembling accuracy, it is easy to cause problems such as noise and vibration. The four-connecting-rod mechanism has relatively complex overall structure and low transmission efficiency. If connecting rods have a large assembling error, the oscillating effect is unstable, and problems such as jamming and abnormal noise will be easily caused.

Therefore, the prior art still needs to be improved.

SUMMARY

In view of the shortcomings in the prior art, the present disclosure aims to provide an oscillating mechanism of a fan, and a fan, and aims to solve the problem that the oscillating mechanism of the fan in the prior art has poor usage effect.

In order to achieve the above objective, the present disclosure provides the following technical solutions:

An oscillating mechanism of a fan includes:
  a rotating assembly, wherein the rotating assembly includes a rotating member, a fastener fixedly connected to a lower part of the rotating member, and a driving member fixed inside the rotating member; and
  a fixing assembly, wherein the fixing assembly includes a first fixing member and a second fixing member fixedly connected to the first fixing member; the second fixing member is arranged above the first fixing member; the first fixing member is fixedly connected to an output portion of the driving member;
  the fastener is located between the first fixing member and the second fixing member to limit the rotating member onto the fixing assembly; and the rotating member sleeves the second fixing member and rotates relative to the fixing assembly under the driving of the driving member.

A spacing plate is arranged in a hollow portion of the second fixing member; a first bearing is arranged on one side of the spacing plate; an outer ring of the first bearing is matched with an inner wall of the second fixing member; and a circumferential side of the rotating member is matched with an inner ring of the first bearing.

A second bearing coaxial with the first bearing is arranged on the other side of the spacing plate; an outer ring of the second bearing is matched with the inner wall of the second fixing member; and the circumferential side of the rotating member is matched with an inner ring of the second bearing.

The first bearing is located above the second bearing; the fastener is located below the second bearing; a first step portion is arranged on the fastener; and the first step portion is in contact with an end surface of the second bearing.

A second step portion is arranged on the fastener; the second step portion is located on an inner side of the first step portion and is higher than the first step portion; a circumferential side of the second step portion is matched with the inner ring of the second bearing; and an end surface of the second step portion is in contact with a lower end surface of the rotating member.

One of the rotating member and the second fixing member is provided with a limiting member, and the other one of the rotating member and the second fixing member is provided with a limiting slot; and when the rotating member and the second fixing member are assembled, the limiting member is located in the limiting slot to limit an angle of relative rotation between the rotating assembly and the fixing assembly.

A first fixing portion protrudes on an inner circumference of the fastener; the lower part of the rotating member is a hollow cylinder; a second fixing portion protrudes on an inner circumference of the lower part of the rotating member; and an end surface of the first fixing portion partially extends upwards to form a positioning portion to cooperate with a circumferential side of the second fixing portion.

The second fixing member includes a first component and a second component located on an outer circumferential side of the first component; a lower end surface of the second component axially extends to form a third fixing portion; the third fixing portion is located on an outer side of the first component; and a fourth fixing portion matched with the third fixing portion is arranged in the first fixing member.

A fan includes an air outlet main body, an oscillating mechanism main body, and the oscillating mechanism of the fan, wherein the air outlet main body is connected to the rotating assembly, and the oscillating mechanism main body is fixedly connected to the fixing assembly.

At least three supporting legs are arranged on the oscillating mechanism main body; the supporting legs are flipped by a preset angle from a direction close to a circumferential side of the oscillating mechanism main body to a direction away from the circumferential side of the oscillating mechanism main body to support the oscillating mechanism main body; the oscillating mechanism main body is provided with an abutment member; abutment notches matched with the abutment member are provided at end portions of the supporting legs, so as to abut against the abutment member after the supporting legs are opened.

Compared with the prior art, the present disclosure provides an oscillating mechanism of a fan, and a fan. The oscillating mechanism of the fan includes:
  a rotating assembly, wherein the rotating assembly includes a rotating member, a fastener fixedly connected to a lower part of the rotating member, and a driving member fixed inside the rotating member; and
  a fixing assembly, wherein the fixing assembly includes a first fixing member and a second fixing member fixedly connected to the first fixing member; the second fixing member is arranged above the first fixing member; the first fixing member is fixedly connected to an output portion of the driving member;
  the fastener is located between the first fixing member and the second fixing member to limit the rotating member onto the fixing assembly; and the rotating member sleeves the second fixing member and rotates relative to the fixing assembly under the driving of the driving member. In the oscillating mechanism of the fan provided by the present disclosure, the rotating member sleeves the fixing assembly and is limited on the fixing assembly through the fastener. The driving member is fixed in the rotating member; the output portion of the driving member is connected to the fixing assembly; and the rotating assembly and the fixing assembly rotate relatively through the driving of the driving member, so that a function of driving the fan to oscillate can be achieved. The overall structure is simple. The problem of poor usage effect of the oscillating mechanism of the fan in the prior art is improved.

NUMERALS IN THE ACCOMPANYING DRAWINGS

Figure 1:
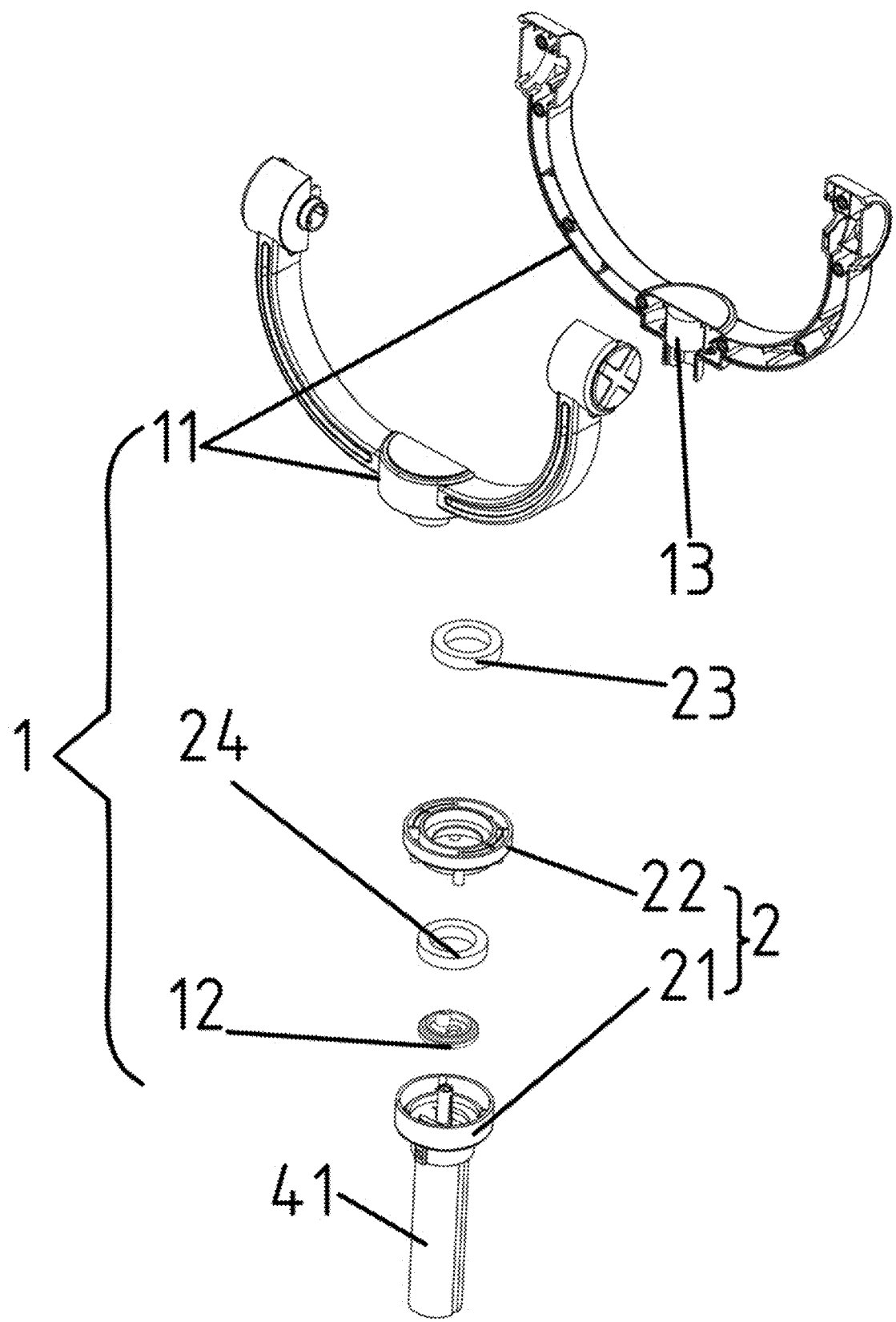
FIG. 1 is an exploded diagram of an oscillating mechanism of a fan according to the present disclosure.
Figure 2:
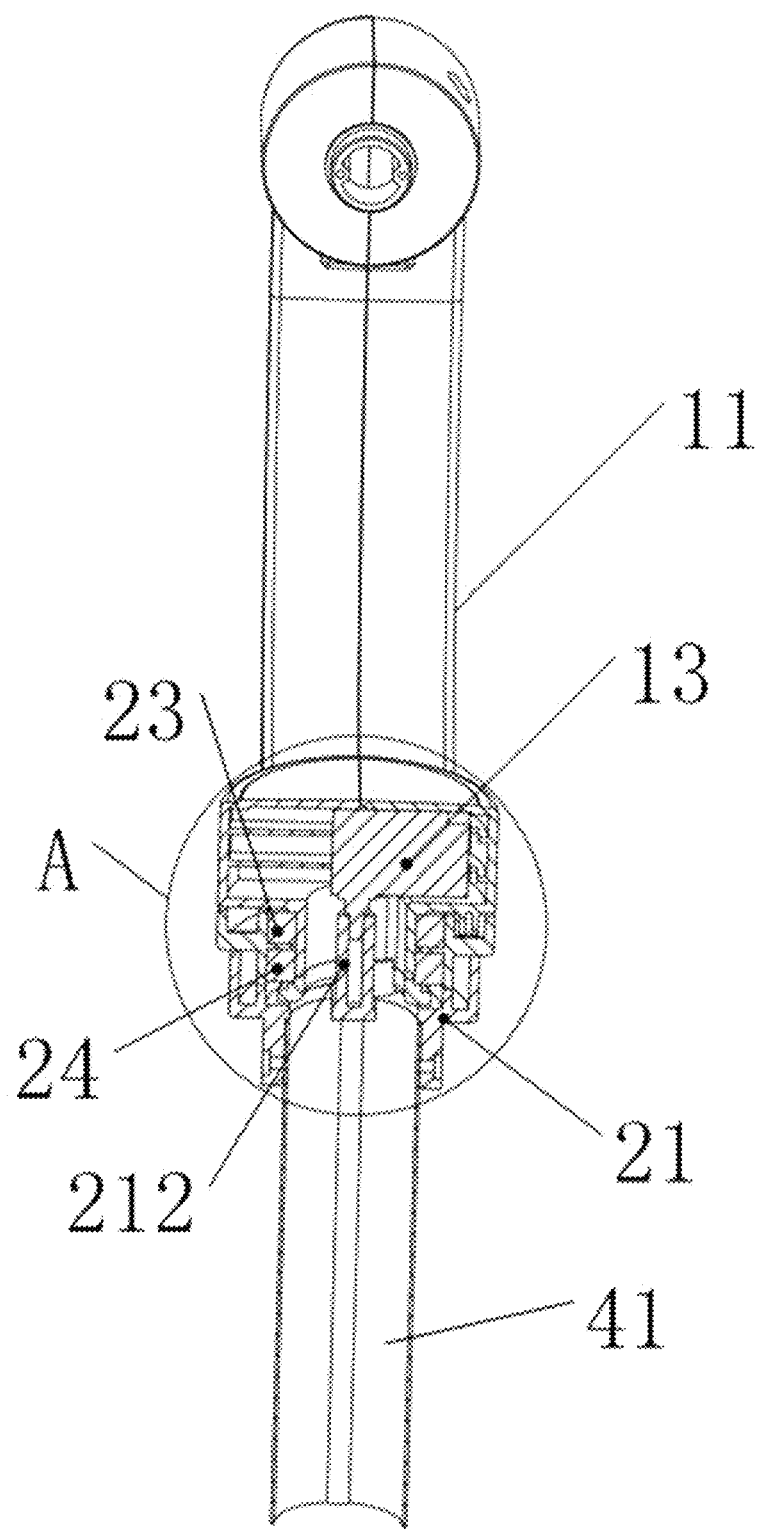
FIG. 2 is a cross-sectional view of an oscillating mechanism of a fan according to the present disclosure.
Figure 3:
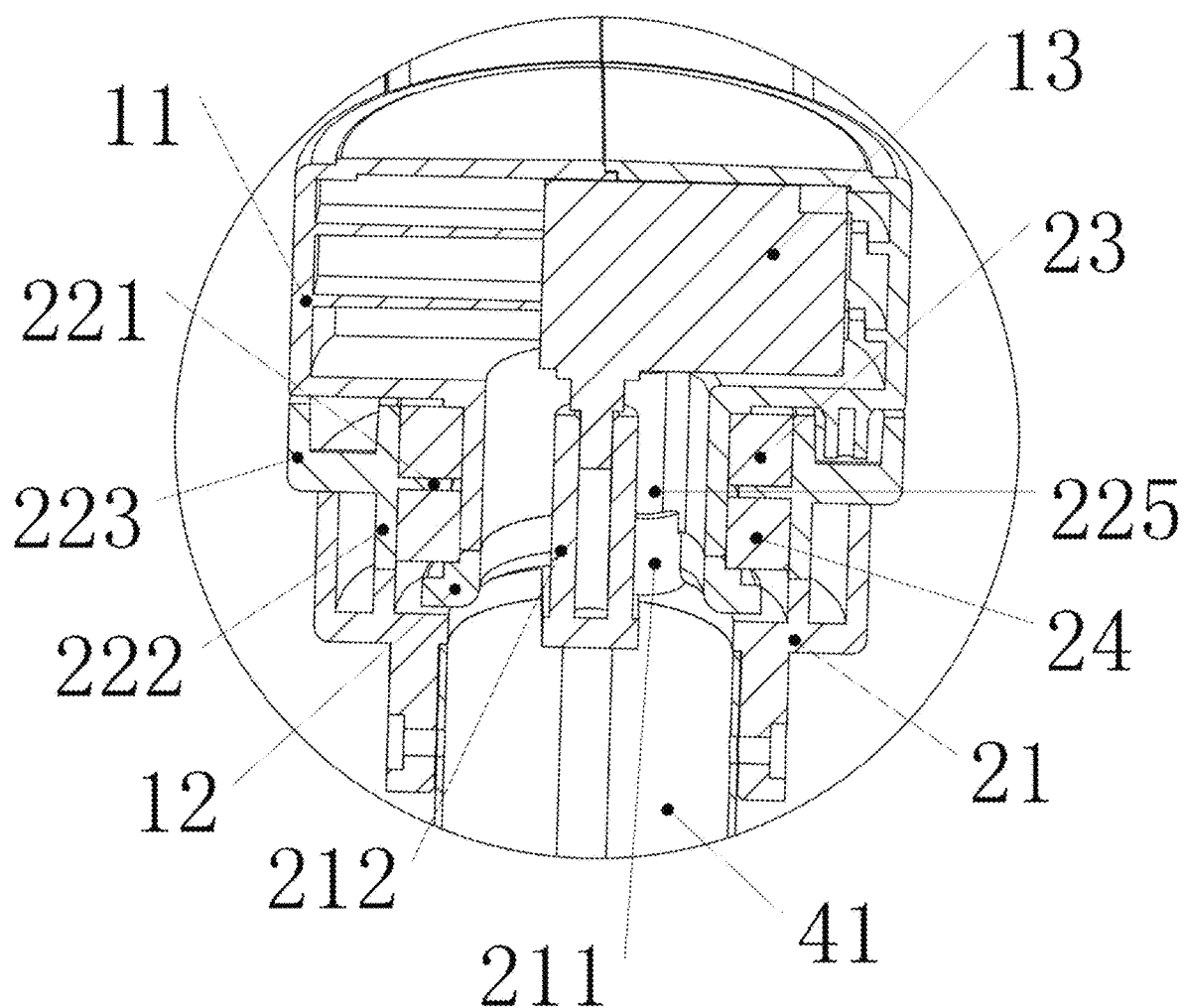
FIG. 3 is an enlarged view of part A in FIG. 2.
Figure 4:
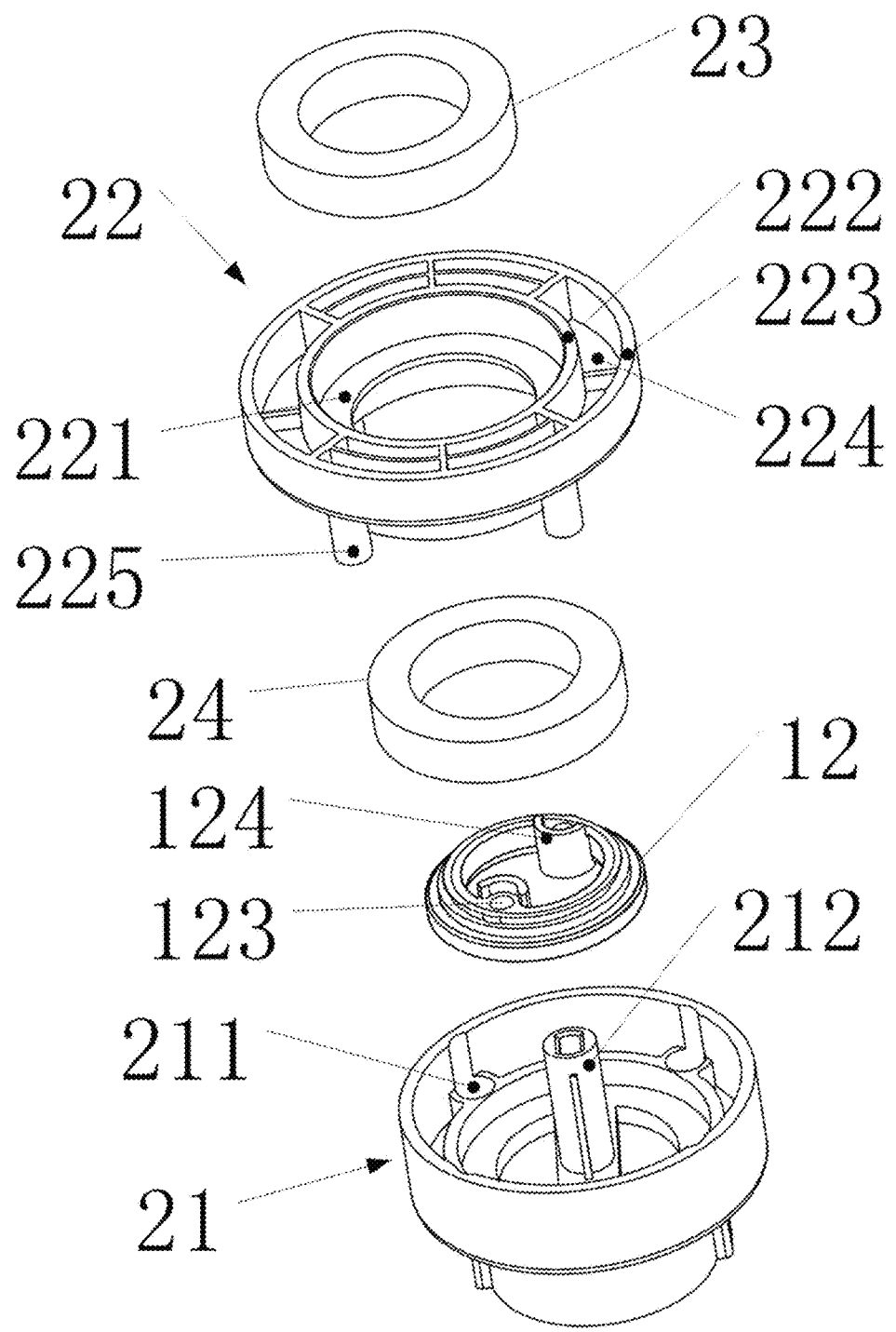
FIG. 4 is an exploded diagram of a fixing assembly, a first bearing, a second bearing, and a fastener in an oscillating mechanism of a fan according to the present disclosure.
Figure 5:
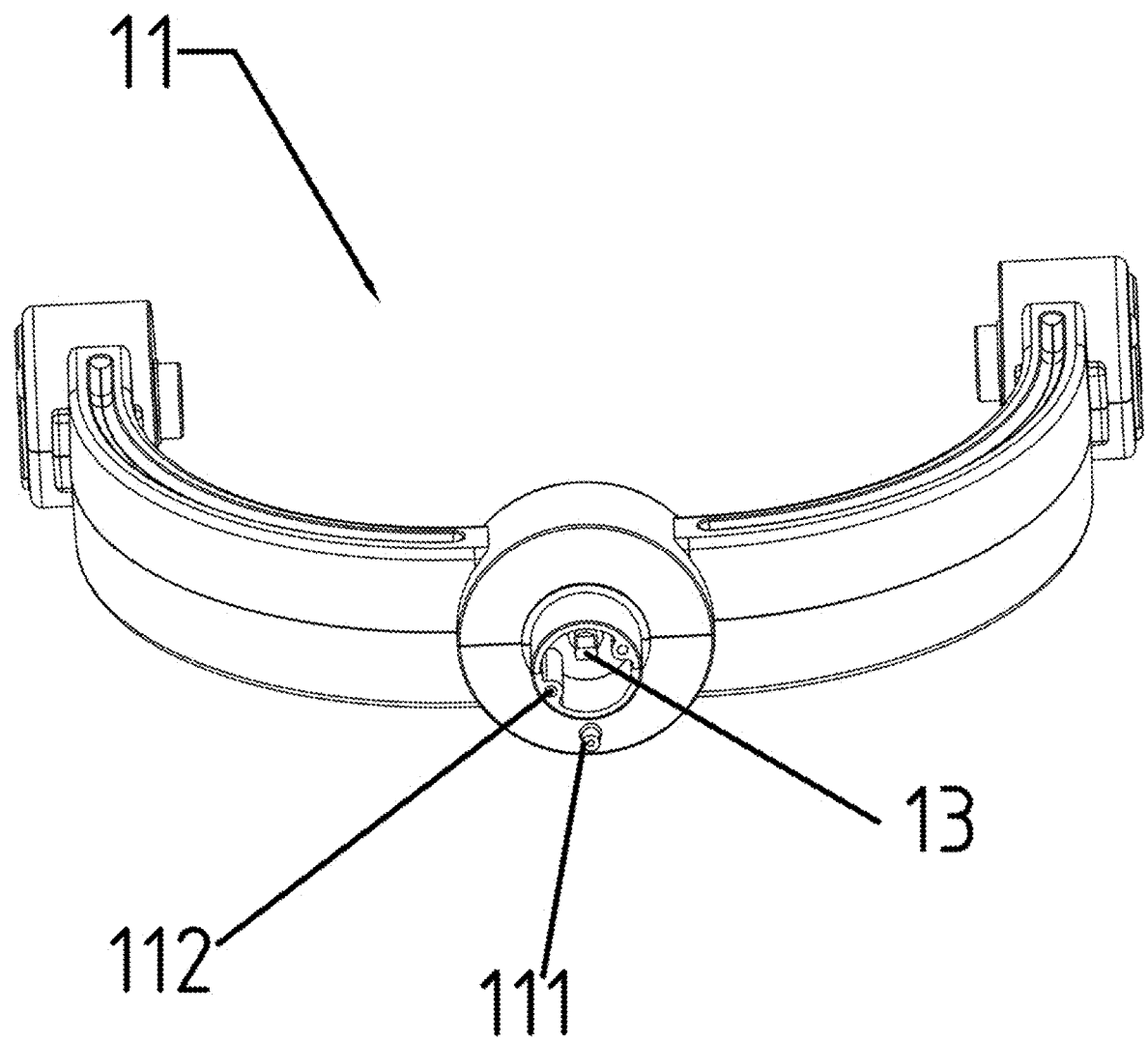
FIG. 5 is a schematic diagram of an assembled structure of a rotating member and a driving member in an oscillating mechanism of a fan according to the present disclosure.
Figure 6:
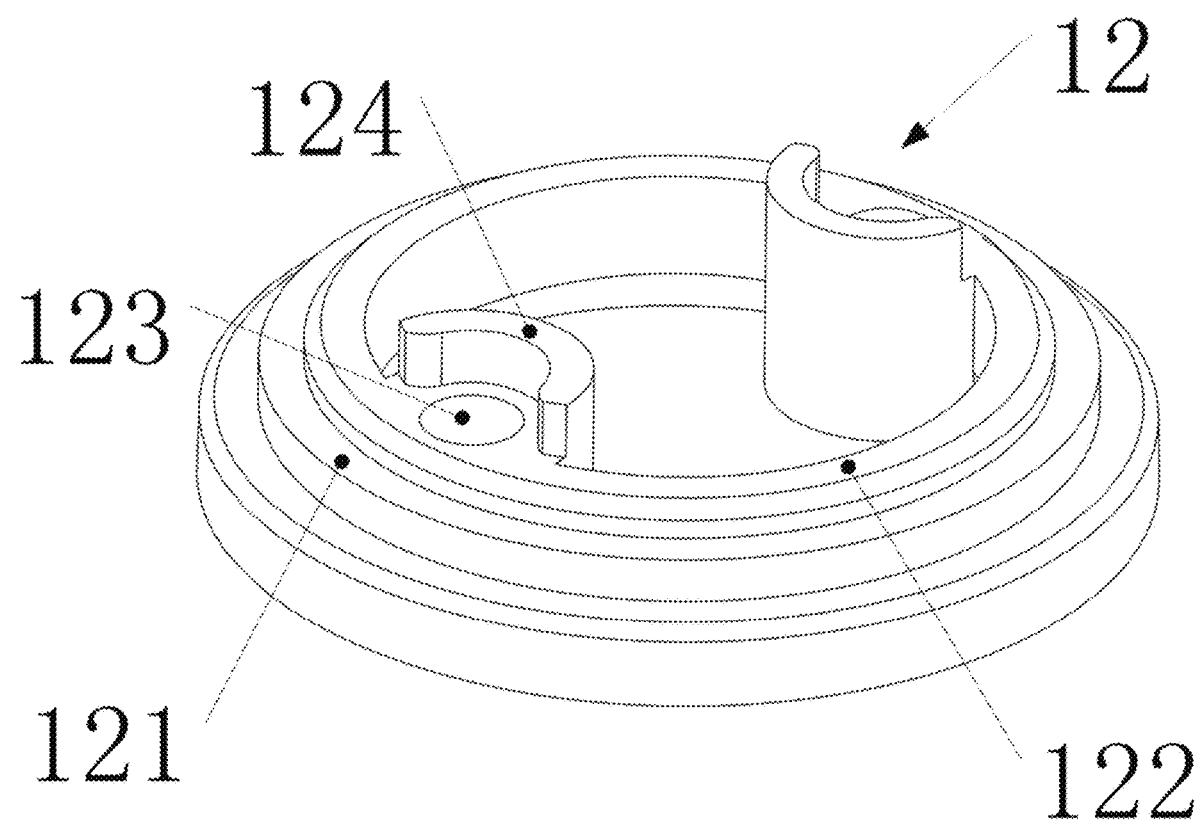
FIG. 6 is a schematic structural diagram of a fastener in an oscillating mechanism of a fan according to the present disclosure.
Figure 7:
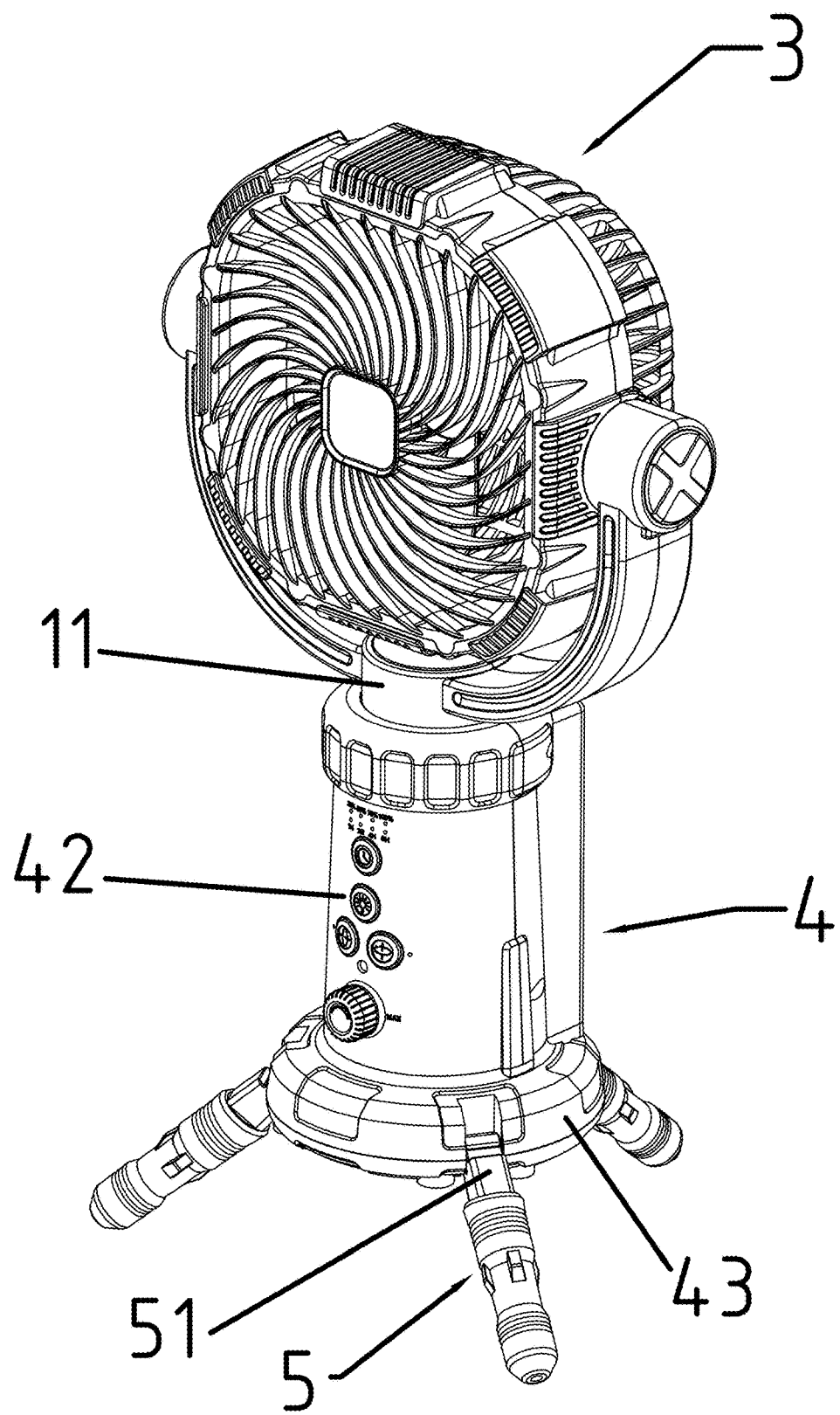
FIG. 7 is a schematic structural diagram of a fan according to the present disclosure.
Figure 8:
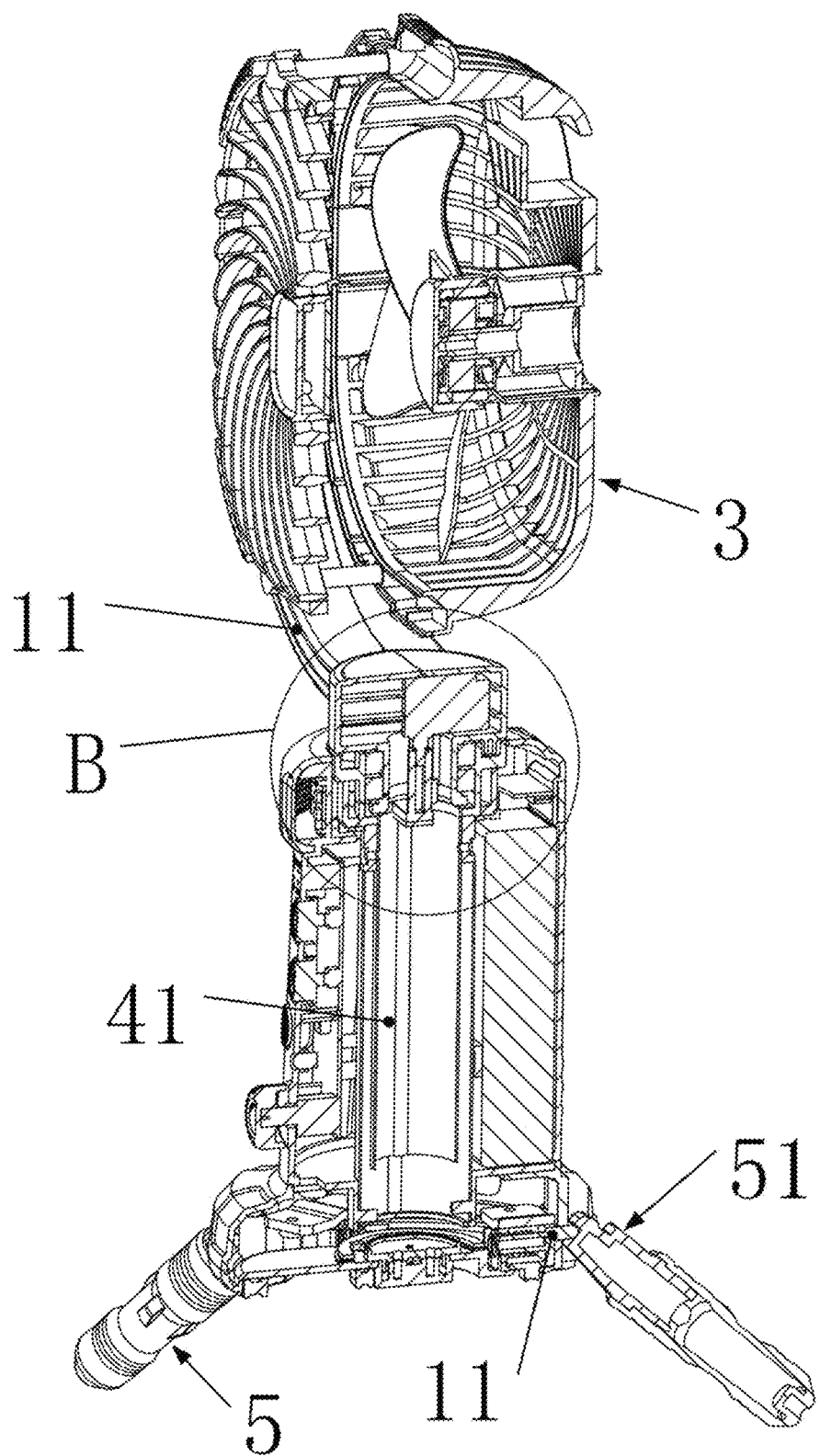
FIG. 8 is cross-sectional view of a fan according to the present disclosure.
Figure 9:
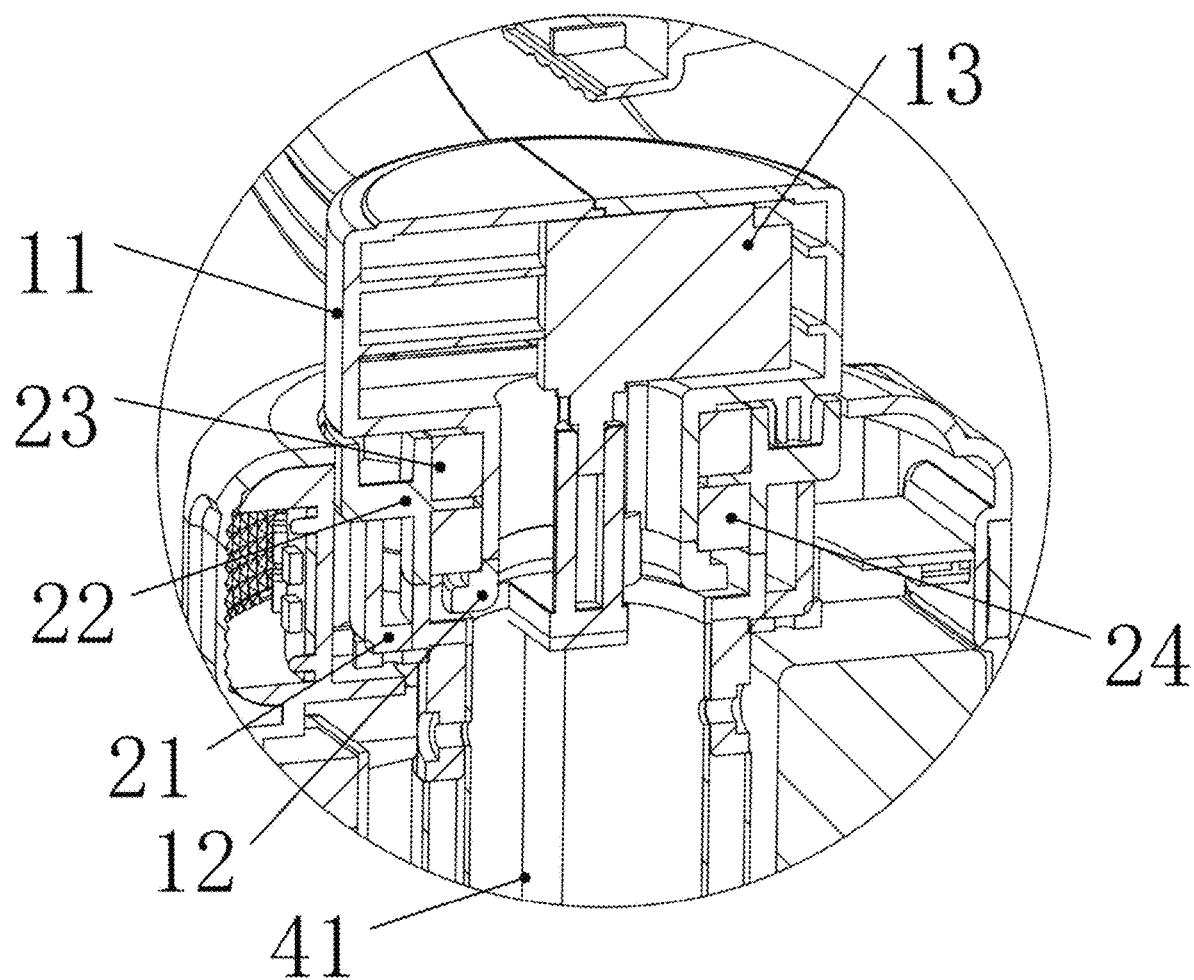
FIG. 9 is an enlarged view of part B in FIG. 8.

1: rotating assembly; 11: rotating member; 111: limiting member; 112: second fixing portion; 12: fastener; 121: first step portion; 122: second step portion; 123: first fixing portion; 124: positioning portion; 13: driving member; 2: fixing assembly; 21: first fixing member; 211: fourth fixing member; 212: connecting column; 22: second fixing member; 221: spacing plate; 222: first component; 223: second component; 224: limiting slot; 225: third fixing portion; 23: first bearing; 24: second bearing; 3: air outlet main body; 4: oscillating mechanism main body; 41: connecting rod; 42: fan shell; 43: base; 431: mounting slot; 432: abutment member; 433: main body portion; 434: guide portion; 435: abutment portion; 436: elastic member; 437: push block; 438: mounting gap; 439: hinge slot; 440: guide gap; 5: supporting leg; 51: T-shaped connecting column; 52: connecting block; 53: hinge column; 54: abutment notch; 55: avoidance portion; and 56: arc-shaped transition portion.

DETAILED DESCRIPTION OF THE EMBODIMENTS

To make the objectives, technical solutions, and effects of the present disclosure clearer, the following is a further detailed explanation of the present disclosure in conjunction with the accompanying drawings and embodiments. It should be understood that the specific embodiments described here are only intended to explain the present disclosure and are not intended to limit the present disclosure.

It should be noted that when a component is referred to as being "assembled", "fixed", or "arranged" to another component, the component can be directly on the another component or there can be an intermediate component. When one component is considered to be "connected" to another component, the component can be directly connected to the another component or there may be an intermediate component.

It should be further noted that the terms such as left, right, upper, and lower in the embodiments of the present disclosure are only relative concepts or are references according to a normal usage state of a product, instead of being considered as being limitative.

A fan is a household appliance that uses a motor to drive fan blades rotation, thereby accelerating flowing of air. The fan is mainly applied to cooling and air circulation. To enhance the air supply effect and cooling effect of the fan, the fan is usually provided with an oscillating mechanism. The oscillating mechanism of the fan in the prior art usually achieves an oscillating effect by combining a motor and a gear or through a four-connecting-rod mechanism. This oscillating mechanism has the shortcomings that the motor and the gear are combined, so that the overall structure will occupy a large space, and the fan has a large size. In addition, when the gear has low machining and assembling accuracy, it is easy to cause problems such as noise and vibration, which affects the user experience. The four-connecting-rod mechanism has relatively complex overall structure and low transmission efficiency. If connecting rods have a large assembling error, the oscillating effect is unstable, and faults such as jamming and abnormal noise will be easily caused, which affects normal use by a user.

In view of the above problems, the present disclosure provides an oscillating mechanism of a fan, referring to FIG. 1 to FIG. 6, including:

a rotating assembly 1, wherein the rotating assembly 1 includes a rotating member 11, a fastener 12 fixedly connected to a lower part of the rotating member 11, and a driving member 13 fixed inside the rotating member 11; and a fixing assembly 2, wherein the fixing assembly 2 includes a first fixing member 21 and a second fixing member 22 fixedly connected to the first fixing member 21; the second fixing member 22 is arranged above the first fixing member 21; and the first fixing member 21 is fixedly connected to an output portion of the driving member 13.

The fastener 12 is located between the first fixing member 21 and the second fixing member 22 to limit the rotating member 11 onto the fixing assembly 2; and the rotating member 11 sleeves the second fixing member 22 and rotates relative to the fixing assembly 2 under the driving of the driving member 13. In the oscillating mechanism of the fan provided by the present disclosure, the rotating member 11 sleeves the fixing assembly and is limited on the fixing assembly 2 through the fastener 12. The driving member 13 is fixed in the rotating member 11; the output portion of the driving member 13 is connected to the fixing assembly 2; and the rotating assembly 1 and the fixing assembly 2 rotate relatively through the driving of the driving member 13, so that a function of driving the fan to oscillate can be achieved. The overall structure is simple. The problem of poor usage effect of the oscillating mechanism of the fan in the prior art is improved. In addition, the overall mounting structure is compact, so that the size of the fan is reduced, and it is convenient for a user to carry the product.

Further, referring to FIG. 1 to FIG. 4, a spacing plate 221 is arranged in a hollow portion of the second fixing member 22; a first bearing 23 is arranged on one side of the spacing plate 221; an outer ring of the first bearing 23 is matched with an inner wall of the second fixing member 22; and a circumferential side of the rotating member 11 is matched with an inner ring of the first bearing 23.

In the present disclosure, the second fixing member 22 includes a first component 222 and a second component 223 located on an outer circumferential side of the first component 222. The first component 222 and the second component 223 are of integrally formed structures. The first component 222 is a hollow cylinder, and the second component 223 is of a ring-like structure; A cross section of the second component 223 is L-shaped. A horizontal portion of the second component 223 is connected to an outer side wall of the first component 222, and the horizontal portion of the second component 223 is higher than a lower end surface of the first component 222. An inner wall of the first component 222 extends towards a center to form the circular-ring-shaped spacing plate 221. An inner diameter of the spacing plate 221 is less than a diameter of an inner ring of the first bearing 23 to: avoid friction between the rotating member 11 and the spacing plate 221 when rotating relative to the second fixing member 22, and avoid friction between an end surface of the inner ring of the first bearing 23 and an end surface of the spacing plate 221. The arrangement of the spacing plate 221 achieves a limiting effect on the fastener 12 in an axial direction, so that the fastener 12 is located between the first fixing member 21 and the second fixing member 22 to limit the rotating member 11 on the fixing assembly 2, thereby ensuring that when the rotating member 11 sleeves the second fixing member 22, the rotating member 11 rotates stably relative to the second fixing member 22 under the driving of the driving member 13. To reduce the friction generated during the rotation, a side edge of the fastener 12 is in no contact with the fixing assembly 2. Due to the arrangement of the first bearing 23, sliding friction during the relative rotation between the rotating member 11 and the second fixing member 22 is converted into rolling friction, thereby reducing the friction force between them, improving the smoothness of the relative rotation, and reducing the noise generated during the relative rotation. In addition, due to the arrangement of the bearings, the driving member 13 can output small driving force, which can cause the relative rotation between the rotating member 11 and the fixing assembly 2, which reduces the selection cost on the driving member 13.

In an embodiment of the present disclosure, the first bearing 23 is located above the spacing plate 221; a lower end surface of the spacing plate 221 is in direct contact with the fastener 12, which limits the position of the fastener 12 in the axial direction. Since the lower part of the rotating member 11 is connected to the fastener 12, and the fastener 12 is located between the first fixing member 21 and the second fixing member 22, the rotating member 11 is limited on the fixing assembly 2. In addition, the rotating member 11 is mounted on the fixing assembly 2 through the first bearing 23, and the lower part of the driving member 11 is in contact with the inner ring of the first bearing 23. Since the driving member 13 is fixed inside the rotating member 11, the output portion of the driving member 13 is connected to the first fixing member 21. Under the driving action of the driving member 13, the rotating member 11 rotates relative to the fixing assembly 2.

In another embodiment of the present disclosure, the first bearing 23 is located below the spacing plate 221. Since the first bearing 23 is located between the spacing plate 221 and the fastener 12, the spacing plate 221 indirectly limits the position of the fastener 12 in the axial direction by limiting the position of the first bearing 23. An upper end surface of the first bearing 23 is in contact with a lower end surface of the spacing plate 221, and a lower end surface of the first bearing 23 is in contact with an end surface of the fastener 12. Since the lower part of the rotating member 11 is connected to the fastener 12, and the fastener 12 is located between the first fixing member 21 and the second fixing member 22, the rotating member 11 is limited on the fixing assembly 2. The output portion of the driving member 13 is connected to the first fixing member 21. Under the driving action of the driving member 13, the rotating member 11 rotates relative to the fixing assembly 2.

Further, referring to FIG. 1 to FIG. 6 again, a second bearing 24 coaxial with the first bearing 23 is arranged on the other side of the spacing plate 221; an outer ring of the second bearing 24 is matched with the inner wall of the second fixing member 22; and the circumferential side of the rotating member 11 is matched with an inner ring of the second bearing 24. The first bearing 23 is located above the second bearing 24; the fastener 12 is located below the second bearing 24; a first step portion 121 is arranged on the fastener 12; and the first step portion 121 is in contact with an end surface of the second bearing 24, so that the rotating assembly 1 is limited on the fixing member 2.

In still another embodiment of the present disclosure, two bearings are arranged on the second fixing member 22. An outer ring of the first bearing 23 and an outer ring of the second bearing 24 are both matched with an inner side wall of the first component 222, and an inner ring of the first bearing 23 and an inner ring of the second bearing 24 are both matched with a circumferential side the lower part of the rotating member 11. The first bearing 23 and the second bearing 24 are arranged on upper and lower sides of the spacing plate 221 in a manner of spacing apart from each other. By the arrangement of the two-bearing structure, a load can be better dispersed and balanced, to reduce the vibrations generated by the driving member 13 during working, so that the relative rotation between the rotating member 11 and the fixing assembly 2 is steadier and the overall life and safety of the rotating structure are improved. In the present disclosure, the first bearing 23 and the second bearing 24 are arranged coaxially. The inner rings of both the first bearing 23 and the second bearing 24 have the same diameters to facilitate the mounting and cooperation with the lower part of the rotating member 11. The outer rings of both the first bearing 23 and the second bearing 24 can be the same or different.

In this embodiment of the two-bearing structure, the lower end surface of the outer ring of the first bearing 23 is in contact with the upper end surface of the spacing plate 221; the lower end surface of the spacing plate 221 is in contact with the upper end surface of the outer ring of the second bearing 24; the end surface of the first step portion 121 is in contact with the lower end surface of the inner ring of the second bearing 24; and the spacing plate 221 limits the position of the fastener 12 in the axial direction through the second bearing 24, thereby ensuring that the rotating member 11 is stably arranged on the fixing assembly 2. The lower part of the rotating member 11 is fixed to the fastener 12 by screwing. When the rotating member 11 rotates relative to the fixing assembly 2, the rotating member 11 may drive the fastener 12 to rotate synchronously relative to the fixing assembly 2. The end surface of the first step portion 121 is in contact with the end surface of the inner ring of the second bearing 24, avoiding the impact of the friction, caused by the contact between the fastener 12 and the end surface of the outer ring of the second bearing 24, on the relative rotation between the rotating member 11 and the fixing assembly 2.

Further, a second step portion 122 is arranged on the fastener 12; the second step portion 122 is located on an inner side of the first step portion 121 and is higher than the first step portion 121; a circumferential side of the second step portion 122 is matched with the inner ring of the second bearing 24; and an end surface of the second step portion 122 is in contact with an end surface of the lower part of the rotating member 11.

In the present disclosure, the fastener 12 is in a circular ring shape. The first step portion 121 and the second step portion 122 are annular bosses formed by upward extension of the fastener 12. The end surface of the first step portion 121 is in contact with the end surface of the inner ring of the second bearing 24. Since the second step portion 122 is located on the inner side of the first step portion 121, and the second step portion 122 is higher than the first step portion 121, the second step portion 122 extends to an inner side of the inner ring of the second bearing 24. A height of the second step portion 122 is less than that of the second bearing 24, so that the lower part of the rotating member 11 can be in contact with the inner ring of the second bearing 24, too, which is conducive to ensuring the synchronization during the rotation of the rotating member 11 and the fastener 12. By the arrangement of the first step portion 121, it ensures that after the rotating member 11 is fixedly connected to the fastener 12, the fastener 12 abuts against the inner ring of the second bearing 24. Due to the existence of the spacing plate 221 above the second bearing 24, the position of the rotating member 11 is indirectly limited in the axial direction, ensuring the stability of mounting of the rotating member 11 in the axial direction. Through the arrangement of the second step portion 122, on the one hand, it facilitates the fixed connection between the rotating member 11 and the fastener 12, and on the other hand, the circumferential side of the second step portion 122 is in contact with a circumferential surface of the inner ring of the second bearing 24, ensuring the synchronization between the fastener 12 and the rotating member 11 during the relative rotation and improving the rotation efficiency. The end surface of the second step portion 122 is in contact with the end surface of the lower part of the rotating member 11, and the second step portion 122 is fixed to the lower part of the rotating member 11 by screwing, so that the fastener 12 is lifted to a height through the rotating member 11, and there is a height difference between a lower end of the fastener 12 and a bottom surface of the first fixing member 21. When the rotating member 11 synchronously drives the fastener 12 to rotate relative to the fixing assembly 2, the height difference prevents friction between the fastener 12 and the first fixing member 21, thereby ensuring the smoothness of the relative rotation between the rotating member 11 and the fixing assembly 2, and prolonging the service life of the fastener 12.

Further, one of the rotating member 11 and the second fixing member 22 is provided with a limiting member 111, and the other one of the rotating member 11 and the second fixing member 22 is provided with a limiting slot 224; and when the rotating member 11 and the second fixing member 22 are assembled, the limiting member 111 is located in the limiting slot 224 to limit an angle of the relative rotation between the rotating assembly 1 and the fixing assembly 2. In the embodiments of the present disclosure, the limiting member 111 is arranged on the rotating member 11, and the limiting slot 224 is provided on the second fixing member 22. The limiting slot 224 is located between the first component 222 and the second component 223. The limiting slot 224 is an arc-shaped guide space. After the rotating member 11 is mounted and cooperates with the second fixing member 22, the limiting member 111 is located in the limiting slot 224. The limiting slot 224 can play an auxiliary guide role during the relative rotation between the rotating member 11 and the fixing assembly 2, to further improve the stability of the relative rotation, and further play a limiting role to ensure the effect of the relative rotation between the rotating member 11 and the fixing assembly 2. The structure is simple.

Further, the fastener 12 is of a ring-like structure; a first fixing portion 123 protruding towards the center of the fastener is arranged on an inner circumference of the fastener 12; the lower part of the rotating member 11 is a hollow cylinder; a second fixing portion 112 protrudes on an inner circumference of the lower part of the rotating member 11; and an end surface of the first fixing portion 123 partially extends upwards to form a positioning portion 124 to cooperate with a circumferential side of the second fixing portion 112. In the present disclosure, threaded holes are provided in the first fixing portion 123 and the second fixing portion 112, and a countersunk hole coaxial with the threaded hole is further provided on the first fixing portion 123. A screw extends from a bottom of the first fixing portion 123 into the second fixing portion 112 to fix the fastener 12 with the rotating member 11 by screwing. The fixed connection method is simple and convenient, and an end portion of the screw is located in the countersunk hole to avoid the impact on the assembling of other components. The positioning portion 124 is arc-shaped. After the fastener 12 and the rotating member 11 are mounted and cooperate with each other, the positioning portion 124 cooperates with a circumferential side of the second fixing portion 112. On the one hand, the arrangement of the positioning portion 124 plays a guide role, facilitating the determination of the relative positions of the first fixing portion 123 and the second fixing portion 112, which is conducive to the mounting and cooperation of the fastener 12 and the rotating member 11. On the other hand, the arrangement of the positioning portion plays a relative limiting role in a circumferential direction, avoiding the relative rotation between the fastener 12 and the rotating member 11.

Further, the second fixing member 22 includes a first component 222 and a second component 223 located on an outer circumferential side of the first component 222; a lower end surface of the second component 223 axially extends to form a third fixing portion 225; the third fixing portion 225 is located on an outer side of the first component 222; the first component 222 and the third fixing portion 225 extend into a hollow portion of the first fixing member 21; and a fourth fixing portion 211 matched with the third fixing portion 225 and a supporting ring (not shown) configured to support the first component 222 are arranged in the first fixing member 21, to ensure the stability of assembling of the first fixing member 21 and the second fixing member 22. The third fixing portion 225 is a fixing column, and the fourth fixing portion 211 is provided with a fixing slot (not shown) configured to mount the third fixing portion 225. Threaded holes are provided in the fixing slot and the fixing column. A countersunk hole coaxial with the threaded hole of the fixing slot is provided on a lower end surface of the second component 223. A screw enters the third fixing portion 225 and the fourth fixing portion 211 from the lower end surface of the second component 223 to fixedly connect the first fixing member 21 to the second fixing member 22. The cooperation between the third fixing portion 225 and the fourth fixing portion 211 can play a guide role, facilitating the mounting of the first fixing member 21 and the second fixing member 22, and further play a limiting role in the circumferential direction, avoiding relative rotation.

The present disclosure further correspondingly provides a fan, referring to FIG. 1 to FIG. 9, including an air outlet main body 3, an oscillating mechanism main body 4, and the oscillating mechanism of the fan. The air outlet main body 3 is connected to the rotating assembly 1, and the oscillating mechanism main body 4 is fixedly connected to the fixing assembly 2. The oscillating mechanism of the fan in the present disclosure is configured to achieve an oscillating function of the fan. The oscillating mechanism has a simple structure and a stable oscillating effect, and occupies a small space.

Further, in the present disclosure, an upper part of the rotating member 11 is of an arc-shaped structure to mount the air outlet main body 3. A lower part of the rotating member 11 is a hollow cylinder. The rotating member 11 is formed by assembling two opposite shells. The driving member 13 is a motor. The driving motor 13 is fixed in a mounting member. A rotating shaft of the driving member 13 is connected to a connecting column 212 in the middle of the first fixing member 21 to drive the rotating member 11 and the fixing assembly 2 to rotate relative to each other. The oscillating mechanism main body 4 includes a connecting rod 41 and a oscillating mechanism shell 42. A cavity configured to accommodate the connecting rod 41 is provided in the oscillating mechanism shell 42, and the connecting rod 41 can be set as a telescopic rod or a hollow rod with a fixed length. The connecting rod 41 in this embodiment of the present disclosure is a telescopic rod. The structure of the telescopic rod belongs to the prior art. In the accompanying drawings, the structure of the telescopic rod is illustrated using an inner rod and an outer rod, without a specific connecting structure. The specific structure of the telescopic rod does not fall within the scope of protection of the present disclosure. A lower part of the first fixing member 21 is a hollow cylinder. The lower part of the first fixing member 21 sleeves an upper end of the connecting rod 41. Threaded holes for screwing fixation are provided on a side wall of the lower part of the first fixing member 21 and a side wall of the connecting rod 41. The connecting rod 41 is fixed below a first fixing frame by screwing, and a lower end of the connecting rod 41 is fixedly connected to the oscillating mechanism shell 42. The oscillating mechanism shell 42 outside the connecting rod 41 is stationary, so that the fixing assembly 2 is stationary too. When an output shaft of the driving member 13 drives the fixing assembly 2, the driving member 13 drives the rotating member 11 to rotate relative to the fixing assembly 2 due to the existence of the first bearing 23 and the second bearing 24, namely, the air outlet main body 3 on the rotating member 11 rotates relative to the fixing assembly 2, thereby achieving an oscillating function of the fan.

Figure 10:
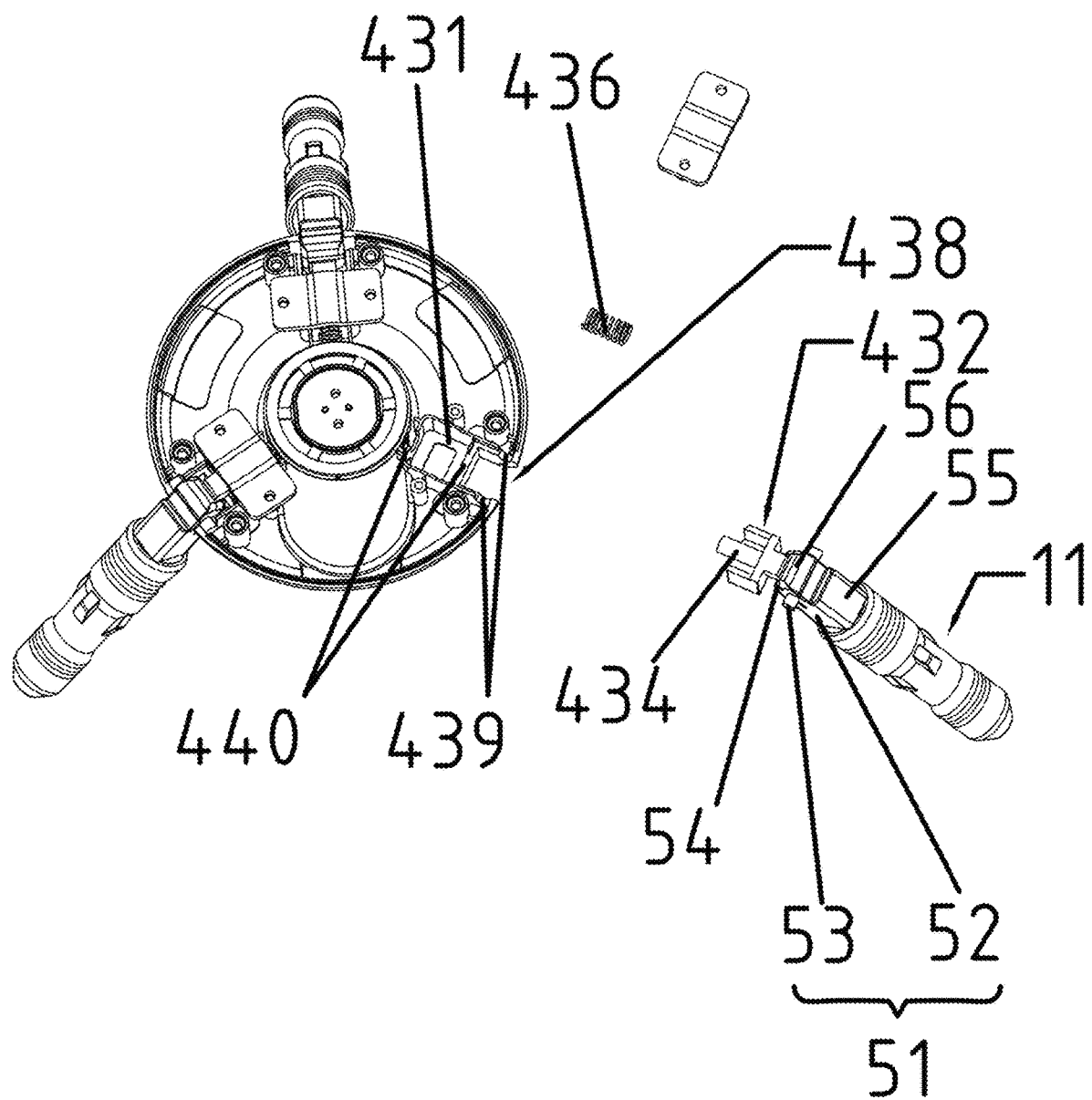
FIG. 10 is an exploded diagram of a base and supporting legs an oscillating mechanism of a fan according to the present disclosure.
Figure 11:
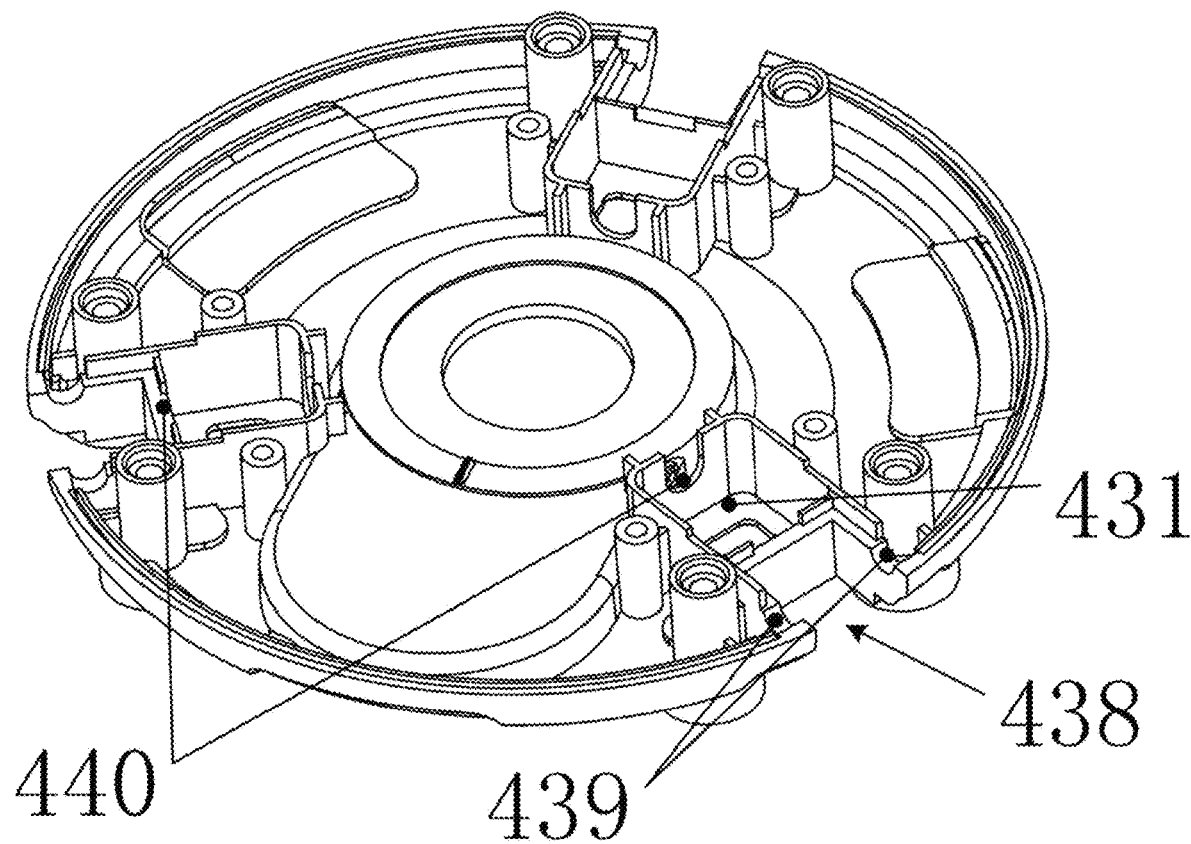
FIG. 11 is a schematic structural diagram of a base in a fan according to the present disclosure.
Figure 12:
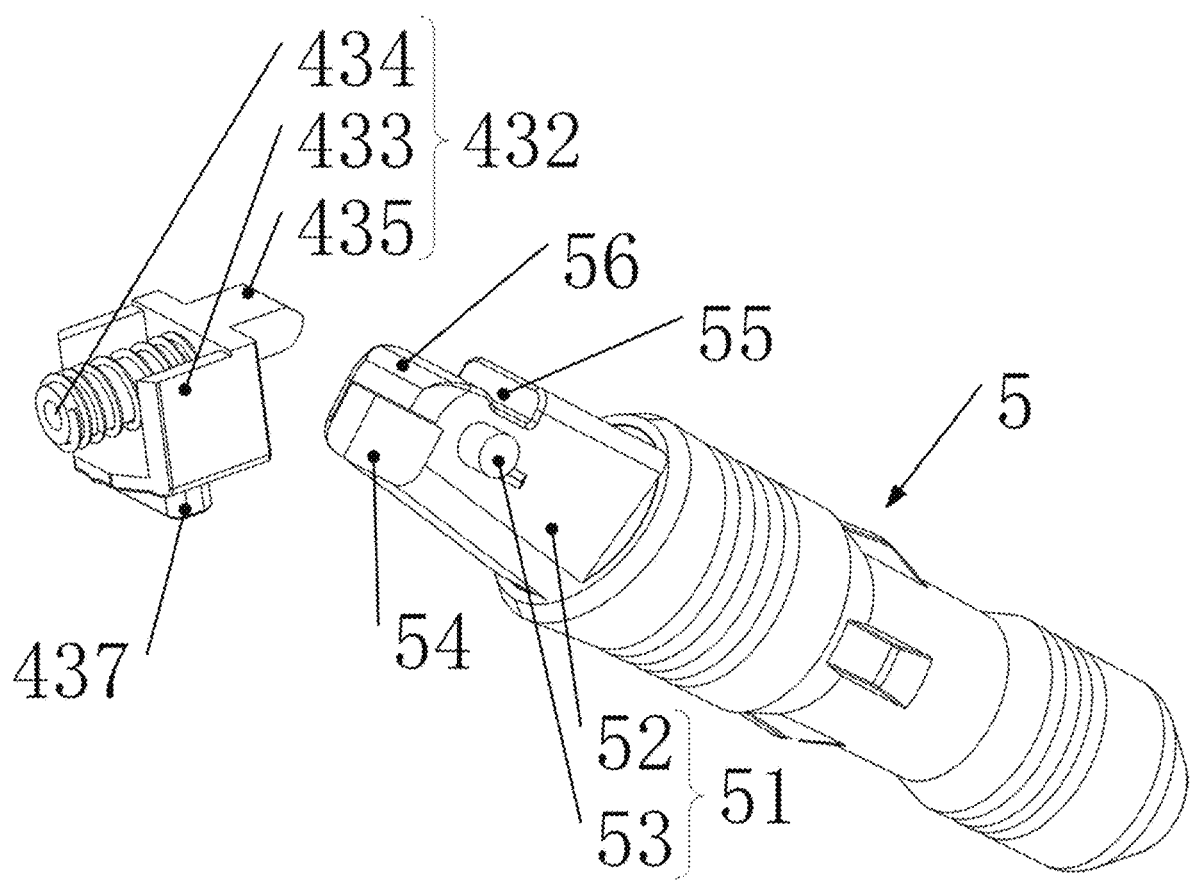
FIG. 12 is an exploded diagram of an abutment member and a supporting leg in a fan according to the present disclosure.
Figure 13:
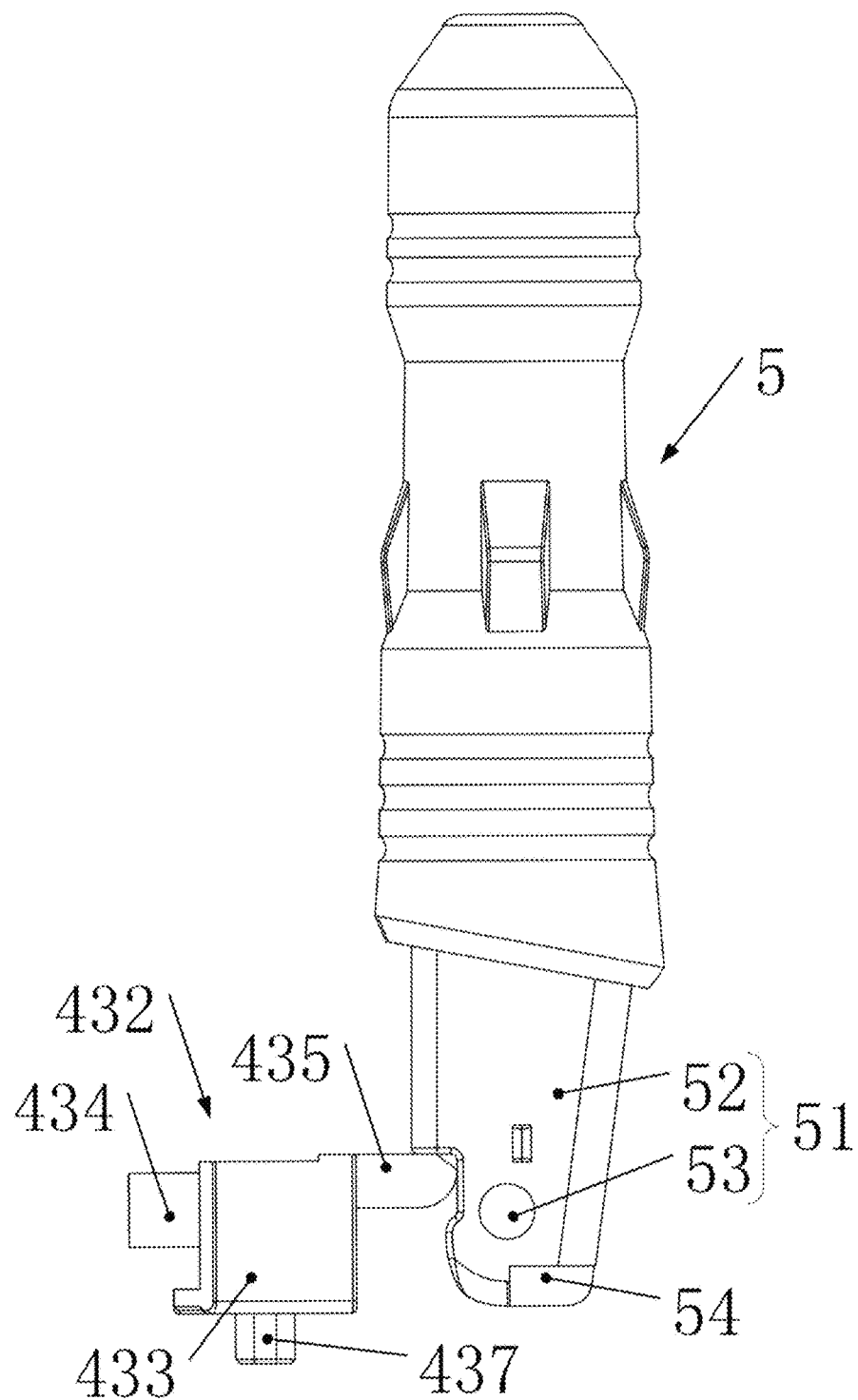
FIG. 13 is a schematic diagram of a state between a supporting leg in storage and an abutment member in a fan according to the present disclosure.

Referring to FIG. 10 to FIG. 12, at least three supporting legs 5 are arranged on the oscillating mechanism main body 4; the supporting legs 5 are flipped by a preset angle from a direction close to a circumferential side of the oscillating mechanism main body 4 to a direction away from the circumferential side of the oscillating mechanism main body 4 to support the oscillating mechanism main body 4; the oscillating mechanism main body 4 is provided with an abutment member 432; abutment notches 54 matched with the abutment member 432 are provided at end portions of the supporting legs 5, so as to abut against the abutment member 432 after the supporting legs 5 are opened.

In the present disclosure, the oscillating mechanism main body 4 further includes a base 43 arranged at a lower end of the oscillating mechanism shell 42. The supporting legs 5 are arranged on a circumferential side of the base 43 to achieve a supporting function on the oscillating mechanism main body 4. There are three supporting legs 5 achieving stable supporting. A mounting slot 431 is provided on the base 43, and the abutment member 432 is arranged in the mounting slot 431 to limit an opening angle of the supporting legs 5 when the supporting legs 5 are opened. A fixing plate (not shown) is arranged at an upper end of the mounting slot 431 to limit the abutment member 432 in the mounting slot 431. The abutment member 432 includes a main body portion 433. The main body portion 433 is located in the mounting slot 431. One end of the main body portion 433 extends towards a center of the base 43 to form a guide portion 434, and the other end of the main body portion 433 extends towards an outer side of the base 43 to form an abutment portion 435. On the opposite sides of the mounting slot 431. Guide notches 440 for the guide portion 434 and the abutment portion 435 to move. The guide portion 434 is cylindrical, and an elastic member 436 sleeves the guide portion 434. One end of the elastic member 436 is in elastic contact with the main body portion 433, and the other end of the elastic member 436 is in elastic contact with an inner wall of the mounting slot 431. Due to the arrangement of the elastic member 436, the abutment portion 435 can still be in stable contact with the supporting legs 5 after the flipping of the supporting legs 5 is completed, ensuring the stability of the supporting legs 5 after the supporting legs are opened.

Further, a T-shaped connecting column 51 is arranged at an upper end of each supporting leg 5. The T-shaped connecting column 51 includes a connecting block 52 extending upwards from the upper end of the supporting leg 5 and hinge columns 53 protruding out of two sides of an upper end of the connecting block 52. An abutment notch 54 is arranged at an end portion of the connecting block 52 to abut against the abutment portion 435 when the supporting leg 5 is opened. An avoidance portion 55 is further arranged at a side edge of the connecting block 52 to adapt to the abutment portion 435 after the supporting leg 5 is stored. The avoidance portion 55 is provided with an arc-shaped transition portion 56 on one side facing the end portion of the connecting block 52, to successfully open the stored supporting leg 5. The base 43 is provided with a mounting notch 438 configured to accommodate the connecting block 52. The base 43 is provided with hinge slots 439, which are configured to mount the hinge columns 53, on two sides of the mounting notch 438. The abutment portion 435 extends to the top of the mounting notch 438 along the guide notches 440 to abut against the abutment notch 54 when the supporting leg 5 is opened. An arc-shaped surface adapted to the arc-shaped transition portion 56 is arranged on a lower side of an end portion of the abutment portion 435. In the opening process of the supporting leg 5, the arc-shaped transition portion 56 is flipped from inside to outside. Under the cooperation with the arc-shaped surface, the arc-shaped transition portion 56 is flipped more smoothly. A push block 437 is arranged at a lower end of the main body portion 433, and an opening for allowing the push block 437 to pass through a lower end surface of the base 43 is provided at a lower end of the mounting slot 431, so that a user can push the push block below the base 43. During the storage of the supporting leg 5, the push block 437 is pushed towards the center of the base 43 to drive the abutment member 432 to move towards the center of the base 43, avoiding the impact of the abutment portion 435 on the flipping and storage of the supporting leg 5.

In summary, the present disclosure provides an oscillating mechanism of a fan, and a fan. The oscillating mechanism of the fan includes:
- a rotating assembly, wherein the rotating assembly includes a rotating member, a fastener fixedly connected to a lower part of the rotating member, and a driving member fixed inside the rotating member; and
- a fixing assembly, wherein the fixing assembly includes a first fixing member and a second fixing member fixedly connected to the first fixing member; the second fixing member is arranged above the first fixing member; the first fixing member is fixedly connected to an output portion of the driving member;
- the fastener is located between the first fixing member and the second fixing member to limit the rotating member onto the fixing assembly; and the rotating member sleeves the second fixing member and rotates relative to the fixing assembly under the driving of the driving member. In the oscillating mechanism of the fan provided by the present disclosure, the rotating member sleeves the fixing assembly and is limited on the fixing assembly through the fastener. The driving member is fixed in the rotating member; the output portion of the driving member is connected to the fixing assembly; and the rotating assembly and the fixing assembly rotate relatively through the driving of the driving member, so that a function of driving the fan to oscillate can be achieved. The overall structure is simple. The problem of poor usage effect of the oscillating mechanism of the fan in the prior art is improved.

It can be understood that a person of ordinary skill in the art can make equivalent substitutions or changes based on the technical solutions and utility model concept of the present disclosure, and all these changes or substitutions shall fall within the scope of protection of the attached claims of the present disclosure.

What is claimed is:

1. An oscillating mechanism of a fan, comprising:
a rotating assembly, wherein the rotating assembly comprises a rotating member, a fastener fixedly connected to a lower part of the rotating member, and a driving member fixed inside the rotating member; and
a fixing assembly, wherein the fixing assembly comprises a first fixing member and a second fixing member fixedly connected to the first fixing member; the second fixing member is arranged above the first fixing member; the first fixing member is fixedly connected to an output portion of the driving member;
the fastener is located between the first fixing member and the second fixing member to limit the rotating member onto the fixing assembly; and the rotating member sleeves the second fixing member and rotates relative to the fixing assembly under the driving of the driving member.

2. The oscillating mechanism of the fan according to claim 1, wherein a spacing plate is arranged in a hollow portion of the second fixing member; a first bearing is arranged on one side of the spacing plate; an outer ring of the first bearing is matched with an inner wall of the second fixing member; and a circumferential side of the rotating member is matched with an inner ring of the first bearing.

3. The oscillating mechanism of the fan according to claim 2, wherein a second bearing coaxial with the first bearing is arranged on the other side of the spacing plate; an outer ring of the second bearing is matched with the inner wall of the second fixing member; and the circumferential side of the rotating member is matched with an inner ring of the second bearing.

4. The oscillating mechanism of the fan according to claim 3, wherein the first bearing is located above the second bearing; the fastener is located below the second bearing; a first step portion is arranged on the fastener; and the first step portion is in contact with an end surface of the second bearing.

5. The oscillating mechanism of the fan according to claim 4, wherein a second step portion is arranged on the fastener; the second step portion is located on an inner side of the first step portion and is higher than the first step portion; a circumferential side of the second step portion is matched with the inner ring of the second bearing; and an end surface of the second step portion is in contact with a lower end surface of the rotating member.

6. The oscillating mechanism of the fan according to claim 1, wherein one of the rotating member and the second fixing member is provided with a limiting member, and the other one of the rotating member and the second fixing member is provided with a limiting slot; and when the rotating member and the second fixing member are assembled, the limiting member is located in the limiting slot to limit an angle of the relative rotation between the rotating assembly and the fixing assembly.

7. The oscillating mechanism of the fan according to any one of claims 1 to 6, wherein a first fixing portion protrudes on an inner circumference of the fastener; the lower part of the rotating member is a hollow cylinder; a second fixing portion protrudes on an inner circumference of the lower part of the rotating member; and an end surface of the first fixing portion partially extends upwards to form a positioning portion to cooperate with a circumferential side of the second fixing portion.

8. The oscillating mechanism of the fan according to claim 2, wherein the second fixing member comprises a first component and a second component located on an outer circumferential side of the first component; a lower end surface of the second component axially extends to form a third fixing portion; the third fixing portion is located on an outer side of the first component; and a fourth fixing portion matched with the third fixing portion is arranged in the first fixing member.

9. A fan, comprising an air outlet main body, an oscillating mechanism main body, and the oscillating mechanism of the fan according to claim 1, wherein the air outlet main body is connected to the rotating assembly, and the oscillating mechanism main body is fixedly connected to the fixing assembly.

10. The fan according to claim 9, wherein at least three supporting legs are arranged on the oscillating mechanism main body; the supporting legs are flipped by a preset angle from a direction close to a circumferential side of the oscillating mechanism main body to a direction away from the circumferential side of the oscillating mechanism main body to support the oscillating mechanism main body; the oscillating mechanism main body is provided with an abutment member; abutment notches matched with the abutment member are provided at end portions of the supporting legs, so as to abut against the abutment member after the supporting legs are opened.

* * * * *